United States Patent [19]

Barnett

[11] Patent Number: 4,527,835
[45] Date of Patent: Jul. 9, 1985

[54] SEAT BELT SLEEVE

[75] Inventor: Ronald R. Barnett, Rochester, Mich.

[73] Assignee: General Motors Corporation, Detroit, Mich.

[21] Appl. No.: 521,679

[22] Filed: Aug. 10, 1983

[51] Int. Cl.³ .............................................. A47B 11/00
[52] U.S. Cl. ..................................... 297/482; 297/468
[58] Field of Search ................ 297/468, 482; 280/801; 24/543, 459; 30/151, 153

[56] References Cited

U.S. PATENT DOCUMENTS

| | | | |
|---|---|---|---|
| 1,600,684 | 9/1926 | McGibbon | 24/453 |
| 3,046,056 | 7/1962 | Greene et al. | 297/482 |
| 3,305,266 | 2/1967 | Nicholas et al. | 297/482 |
| 3,437,349 | 4/1969 | Feles et al. | 297/482 |
| 3,550,955 | 12/1970 | Nicholas et al. | 297/482 |
| 3,608,963 | 9/1971 | Steere, Jr. | 297/482 |
| 3,622,203 | 11/1971 | Steere, Jr. | 297/482 |
| 4,118,838 | 10/1978 | Schiefer et al. | 24/459 |
| 4,141,573 | 2/1979 | Ellens | 297/482 |
| 4,208,778 | 6/1980 | Ellens | 29/423 |
| 4,389,059 | 6/1983 | Stephenson | 280/808 |

Primary Examiner—William E. Lyddane
Assistant Examiner—Joseph Falk
Attorney, Agent, or Firm—Charles E. Leahy

[57] ABSTRACT

A plastic sleeve positions a seat belt and conceals a seat belt end having an anchor plate connected to the vehicle body by an anchor bolt assemblage. The plastic sleeve comprises a tubular sleeve portion enclosing the belt end and extending adjacent to the seat. A base extends from the tubular sleeve for interposition between the anchor plate and the vehicle body. The base has integral upstanding side and end walls. A cover extends integrally from the sleeve portion and has downward depending side and end walls adapted to lie adjacent the side and end walls of the base in parallel juxtaposed relationship and overlie and conceal the anchor plate and bolt assemblage. A plastic living hinge connects the tubular sleeve with one of the cover and base, preferably the base, to permit flexure of the cover and base between relative open positions permitting access to the anchor bolt assemblage and closed positions concealing the anchor plate and bolt assemblage. Interfitting snap retention projections are molded integrally with the parallel juxtaposed side walls of the base and the cover to retain the cover and the base in the closed positions. The cover and tubular sleeve are preferably stiffly interconnected relative one another while the base portion is connected to the sleeve portion by a flexible living hinge. Accordingly, subsequent to installing the anchor bolt assemblage, bodily pivoting movement of the tubular sleeve to its use position within the vehicle body and simultaneous closing movement of the cover over the base will establish the cover at the closed position.

3 Claims, 5 Drawing Figures

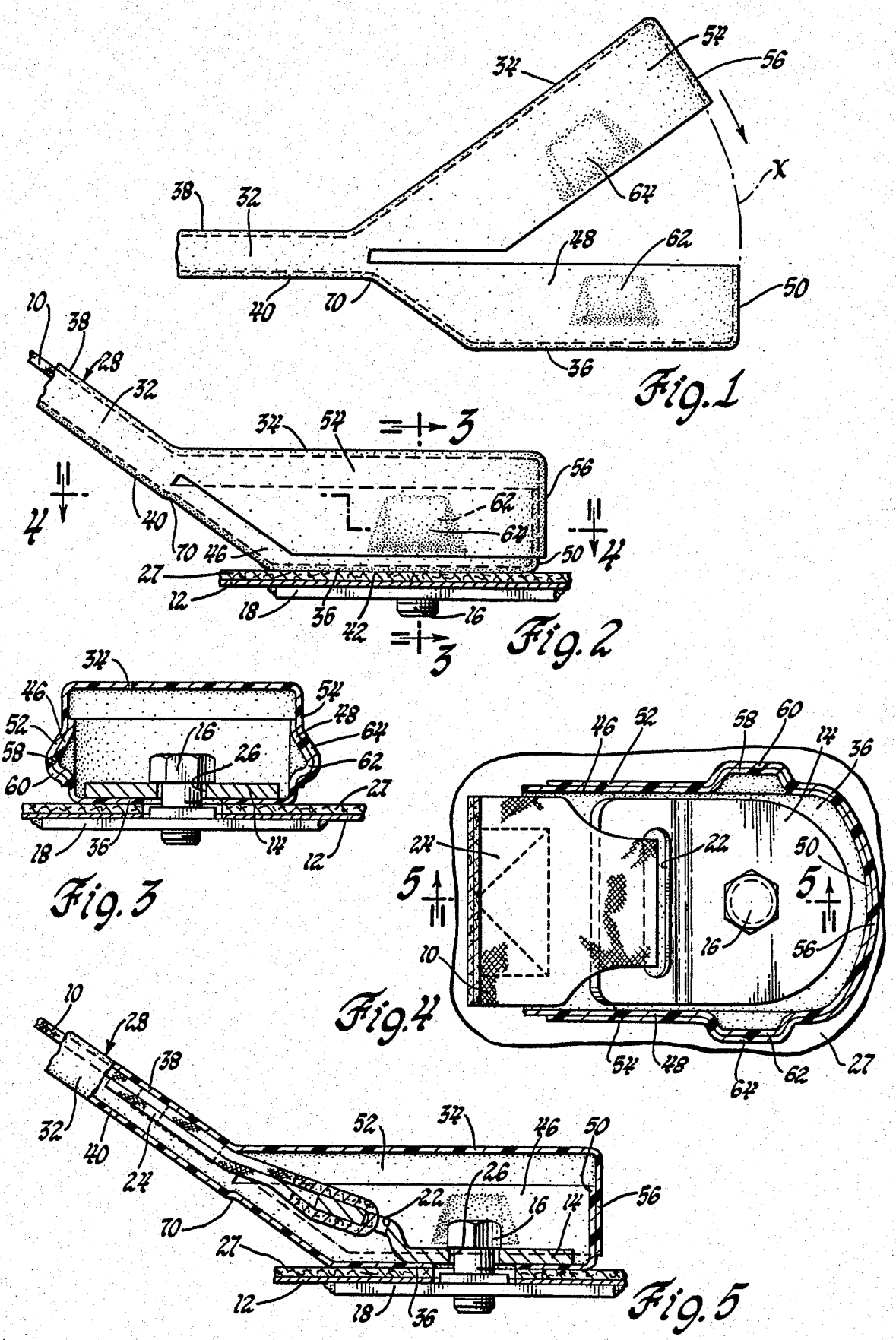

SEAT BELT SLEEVE

The invention relates to a seat belt sleeve and more particularly to a blow molded plastic sleeve enclosing a seat belt anchorage plate and having a cover and a base which snap together.

BACKGROUND OF THE INVENTION

It is well known in motor vehicle occupant restraint systems to employ a restraint belt which is attached to the vehicle body. Typically, the end of the seat belt extends through a slot in an anchor plate and is sewn to itself. The anchor plate is attached to a structural member of the vehicle body, such as the floor pan, by an anchor bolt which extends through an aperture of the anchor plate and is threadedly received in a nut welded beneath the floor pan.

It is well known in such seat belt anchorages to employ a molded plastic sleeve for concealing the end of the seat belt, the anchor plate, and the anchor bolt. The sleeve also positions the belt relative the seat for easy access by the seat occupant. Such seat belt sleeves must be constructed to enable access to the anchor bolt for installing the anchor bolt in the assembly plant and also provide access for later disassembly as may be required for maintenance of the motor vehicle.

Accordingly, prior patents have disclosed various means by which a seat belt sleeve may be secured onto the anchor plate or anchor bolt subsequent to driving of the attachment bolt.

SUMMARY OF THE INVENTION

A plastic sleeve positions a seat belt and conceals a seat belt end having an anchor plate connected to the vehicle body by an anchor bolt assemblage. The plastic sleeve comprises a tubular sleeve portion enclosing the belt end and extending adjacent to the seat. A base extends from the tubular sleeve for interposition between the anchor plate and the vehicle body. The base has integral upstanding side and end walls. A cover extends integrally from the sleeve portion and has downward depending side and end walls adapted to lie adjacent the side and end walls of the base in parallel juxtaposed relationship and overlie and conceal the anchor plate and bolt assemblage. A plastic living hinge connects the tubular sleeve with one of the cover and base, preferably the base, to permit flexure of the cover and base between relative open positions permitting access to the anchor bolt assemblage and closed positions concealing the anchor plate and bolt assemblage. Interfitting snap retention projections are molded integrally with the parallel juxtaposed side walls of the base and the cover to retain the cover and the base in the closed positions. The cover and tubular sleeve are preferably stiffly interconnected relative one another while the base portion is connected to the sleeve portion by a flexible living hinge. Accordingly, subsequent to installing the anchor bolt assemblage, bodily pivoting movement of the tubular sleeve to its use position within the vehicle body and simultaneous closing movement of the cover over the base will establish the cover at the closed position.

Accordingly, the object, feature and advantage of the invention resides in the provision of a seat belt sleeve in which fitting snap retention projections are provided on walls upstanding from a base and walls depending from a cover to provide a snap fitting retention to conceal the anchor plate and anchor bolt assemblage.

DESCRIPTION OF THE DRAWINGS

These and other features, objects and advantages of the invention will become apparent upon consideration of the specification and the appended drawings in which:

FIG. 1 is a side elevation view of the seat belt sleeve in its open position permitting access to the anchor bolt assemblage connecting a seat belt anchor plate to the vehicle body;

FIG. 2 is a side elevation view of the seat belt sleeve mounted in a vehicle body and closed to conceal the seat belt anchor plate and anchor bolt assemblage;

FIG. 3 is a sectional view in the direction of arrows 3—3 of FIG. 2;

FIG. 4 is a sectional view taken in the direction of arrows 4—4 of FIG. 2; and

FIG. 5 is a sectional view taken in the direction of arrows 5—5 of FIG. 4.

DESCRIPTION OF THE PREFERRED EMBODIMENT

Referring to FIGS. 3, 4 and 5 it is seen that a seat belt 10 is attached to the sheet steel floor pan 12 of a motor vehicle body by an anchor plate 14 and an anchor bolt assemblage including an anchor bolt 16 and a weld nut 18 attached beneath the floor pan 12. The anchor plate 14 is a generally planar sheet metal stamping and includes an elongated slot 22 which receives the end of the seat belt 10. The end of the seat belt 10 passes through the slot 22 and is sewn to itself at 24. The anchor plate also has an aperture 26 through which the anchor bolt 16 is inserted. The anchor bolt 16 extends through aligned holes in the carpet 27 and floor pan 12 and is threadedly engaged in the weld nut 18.

A sleeve, generally indicated at 28, is provided to conceal the end of the seat belt 10, the anchor plate 14 and the anchor bolt 16. The sleeve 28 includes integrally molded tubular sleeve 32, cover 34 and base 36. The tubular sleeve 32 includes a top wall 38 and a bottom wall 40. The base 36 is an integral extension of the bottom wall 40 of the tubular sleeve 32 and has a generally planar base wall 42 which is interposed between the anchor plate 14 and the carpet 27 carried by the floor pan 12. The base 36 also includes integral vertically upstanding side walls 46 and 48 and end wall 50 which surround the anchor plate. The cover 34 is molded integrally with the top wall 38 of the sleeve 32 and has integral downwardly depending vertical side walls 52 and 54 and end wall 56 which are closely juxtaposed with the side walls 46 and 48 and end wall 50 of the base 36.

As best seen in FIGS. 2, 3 and 4, side walls of the cover 34 and base 36 are connected by integral snap retainers. The side wall 46 of the base 36 is flared outwardly to provide a tang 58. The side wall 52 of cover 34 is similarly flared outward to provide a tang 60 which seats over the tang 58 as best shown in FIG. 3. Likewise the side wall 48 of the base 36 has a tang 62 which mates with a tang 64 of the cover side wall 54.

Referring to FIG. 1, it is seen that the seat belt sleeve 28 is molded in one piece in the open position by a flow molding process. After the blow molded part is cooled and removed from the mold, the material filling the area bounded by the dot-dash line designated X of FIG. 1 is cutaway to separate the cover 34 and base 36. The cutaway material closely approaches the bottom wall 40 of tubular sleeve 32 to define a living hinge 70 connecting the tubular sleeve 32 with the base 36.

The material cutaway remains distant from the top wall 38 of the belt sleeve 32 so that the belt sleeve 32 is stiffly connected with the cover 34 to substantially limit flexure between the tubular sleeve 32 and the cover 34.

After the belt 10 and anchor plate 14 are installed inside the belt sleeve 28, the belt sleeve, in its open position of FIG. 1, is positioned in the vehicle body with the base wall 42 paralleling the vehicle floor. After the anchor bolt 16 is threaded into the weld nut 18, the tubular sleeve 32 is pivoted upwardly about the living hinge 70 and the cover 34 is simultaneously pivoted downwardly about the living hinge 70 to their respective positions of FIG. 2 in which the cover 34 is snap retained upon the base 36 by the integral snap retainers provided on the juxtaposed side walls of the cover 34 and base 36 as described hereinbefore. After the seat is installed in the vehicle body, the presence of the seat blocks the tubular sleeve 32 against pivoting back toward the position of FIG. 1 relative the base 36 to thereby minimize the forces which the integral snap retainers must withstand.

Thus it is seen that the invention provides a new and improved belt sleeve for enclosing a seat belt anchorage plate and anchorable assemblage.

While the invention is disclosed herein in its preferred embodiment, it will be understood that alternative embodiments may be provided within the scope of the appended claims. For example, the preferred embodiment shown herein has integral snap retainers on the side walls of the cover and base. Alternatively a snap retainer could be provided between the end walls 50 and 56 of the cover 34 and base 36.

The embodiments of the invention in which an exclusive property or privilege is claimed are defined as follows:

1. A molded plastic sleeve for concealing a seat belt end having an anchor plate connected to the vehicle body by an anchor bolt assemblage comprising:
    a tubular sleeve enclosing the belt end; a base extending integrally from the tubular sleeve and adapted for interposition between the anchor plate and the vehicle body, said base having an integral upstanding wall;
    a cover extending integrally from the tubular sleeve and adapted to overlie the base and the anchor plate and bolt assemblage, said cover having a depending wall adapted to overlie the upstanding wall of the base in parallel juxtaposed relationship therewith;
    a plastic living hinge means in connection between the tubular sleeve and at least one of the base and cover to permit flexure of the base and cover between relative open positions permitting access to the anchor bolt assemblage and closed positions with respect to each other to conceal the anchor plate and anchor bolt assemblage between the cover and the base and the wall thereof; and
    interfitting snap retention means molded integrally with the parallel juxtaposed walls of both the base and the cover and adapted for interfitting snap locking retention therebetween to retain the base and the cover in the closed position with respect to each other and thereby conceal the anchor plate and anchor bolt assemblage.

2. A molded plastic sleeve for concealing a seat belt end having an anchor plate connected to the vehicle body by an anchor bolt assemblage comprising:
    a tubular sleeve enclosing the belt end;
    a base adapted for interposition between the anchor plate and the vehicle body and having integral upstanding general vertical walls surrounding the anchor plate of the belt end;
    a plastic living hinge means integrally connecting the tubular sleeve and the base to permit hinging movement of the tubular sleeve relative to the base and the walls thereof;
    a cover extending integrally from the tubular sleeve to overlie the base and the walls thereof, said cover having integral depending generally vertical walls adapted to surround the anchor plate and the upstanding walls of the base in parallel juxtaposed relationship with the upstanding walls of the base; and
    at least one pair of interfitting snap retention means molded integrally with the parallel juxtaposed walls of both the base and the cover and adapted for interfitting snap locking retention with one another to retain the cover on the base in a closed position overlying and concealing the anchor plate and anchor bolt assemblage between the cover and base.

3. In combination with a vehicle seat, a plastic sleeve adapted to conceal a seat belt end having an anchor plate connected to the vehicle body by an anchor bolt assemblage comprising:
    a tubular sleeve for enclosing the belt end and positioning the belt relative to the seat;
    a base molded integrally with the tubular sleeve and adapted for interposition between the anchor plate and the vehicle body, said base having an integral vertical upstanding wall surrounding the anchor plate and a snap tang means molded integral with the wall;
    a cover molded integrally with the tubular sleeve and adapted to overlie and conceal the anchor plate and bolt assemblage, said cover having an integral vertical depending wall adapted to overlie and surround the upstanding wall of the base in parallel juxtaposed relationship therewith and having a snap tang means molded integral therewith and adapted for snap fitting engagement with the snap tang means of the upstanding wall of the base; and
    plastic living hinge means in connection between the tubular sleeve and the base to enable a relative spaced apart open position between the base and the cover for access to install the anchor bolt assemblage connecting the seat belt to the vehicle body and permit unitary pivotal movement of the sleeve and cover about the base subsequent to installing the anchor belt assemblage to effect engagement of the snap tang means between the depending wall of the cover and the upstanding wall of the base and establish the sleeve at a position positioning the seat belt relative to the vehicle seat.

* * * * *